(12) United States Patent
Zhang et al.

(10) Patent No.: US 11,074,413 B2
(45) Date of Patent: Jul. 27, 2021

(54) CONTEXT-SENSITIVE SALIENT KEYWORD UNIT SURFACING FOR MULTI-LANGUAGE SURVEY COMMENTS

(71) Applicant: Microsoft Technology Licensing, LLC, Redmond, WA (US)

(72) Inventors: Xiaoran Zhang, Foster City, CA (US); Goutham Kurra, San Mateo, CA (US); Chih-Po Wen, Redwood City, CA (US); Shane Combest, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 16/370,673

(22) Filed: Mar. 29, 2019

(65) Prior Publication Data

US 2020/0311203 A1    Oct. 1, 2020

(51) Int. Cl.
*G06F 17/00*    (2019.01)
*G06F 11/00*    (2006.01)
(Continued)

(52) U.S. Cl.
CPC .......... *G06F 40/289* (2020.01); *G06F 40/242* (2020.01); *G06F 40/263* (2020.01); *G06F 3/048* (2013.01)

(58) Field of Classification Search
CPC ......... G06F 17/30; G06F 17/28; H04L 29/08; H04L 12/58
See application file for complete search history.

(56) References Cited

U.S. PATENT DOCUMENTS 6,292,769 B1 *  9/2001  Flanagan ................ G06F 40/58
                                                704/3
7,844,861 B2 * 11/2010  Hegarty ............... G06F 11/3684
                                                714/46
(Continued)

OTHER PUBLICATIONS

"Cloud Translation", Retrieved From: https://cloud.google.com/translate/, Retrieved Date: Apr. 15, 2019, 11 Pages.
(Continued)

*Primary Examiner* — Shreyans A Patel
(74) *Attorney, Agent, or Firm* — Schwegman Lundberg & Woessner, P.A.

(57) ABSTRACT

Computer-based implementations of context-sensitive salient keyword unit surfacing for multi-language comments are disclosed. A set of target keyword units in a target written language are caused by a computing system to be presented in a graphical user interface such as, for example, as part of a tag cloud or the like. The set of target keyword units are determined by the system by a context-sensitive mapping of a set of source keyword units in an intermediate written language to the set of target keyword units. The context sensitive mapping is constructed based on in-context machine translation of survey comments in the target language to the intermediate language and then identifying translation keyword unit pairs in the target language survey comments and the translated survey comments that represent a mapping of the in-context translation of a keyword unit in the target language to a keyword unit in the intermediate language.

18 Claims, 6 Drawing Sheets

(51) Int. Cl.
*G06F 40/289* (2020.01)
*G06F 40/242* (2020.01)
*G06F 40/263* (2020.01)
*G06F 3/048* (2013.01)

(56) References Cited

U.S. PATENT DOCUMENTS

| | | | |
|---|---|---|---|
| 2007/0078833 A1* | 4/2007 | Chea | G06Q 30/02 |
| 2014/0222413 A1* | 8/2014 | Rossmann | G06F 40/58 |
| | | | 704/3 |
| 2014/0337989 A1* | 11/2014 | Orsini | G06F 40/51 |
| | | | 726/26 |
| 2016/0162575 A1* | 6/2016 | Eck | G06F 40/58 |
| | | | 707/776 |
| 2018/0089172 A1* | 3/2018 | Needham | H04L 67/306 |
| 2020/0194000 A1* | 6/2020 | Xian | G10L 15/26 |

OTHER PUBLICATIONS

"Shift-Reduce Constituency Parser", Retrieved From: https://nlp.stanford.edu/software/srparser.shtml, Retrieved Date: Mar. 18, 2019, 6 Pages.

"Spanish FAQ for Stanford CoreNLP, parser, POS tagger, and NER", Retrieved From: https://nlp.stanford.edu/software/spanish-faq.shtml, Retrieved Date: Mar. 18, 2019, 10 Pages.

Beckwith, et al., "Design and Implementation of the WordNet Lexical Database and Searching Software", Published in Revised version of Introduction to WordNet: An On-line Lexical Database, pp. 62-86.

Catherine De Marneffe, Marie, et al., "Generating Typed Dependency Parses from Phrase Structure Parses", In Proceedings of the Fifth International Conference on Language Resources and Evaluation, LREC 2006, Genoa, Italy, May 22, 2006, 6 Pages.

Chen, et al., "A Fast and Accurate Dependency Parser using Neural Networks", In Proceedings of the 2014 Conference on Empirical Methods in Natural Language Processing, EMNLP 2014, Oct. 25-29, 2014, Doha, Qatar, A meeting of SIGDAT, a Special Interest Group of the ACL, Oct. 25, 2014, 11 Pages.

Fellbaum, et al., "Adjectives in WordNet", Published in Revised version of Introduction to WordNet: An On-line Lexical Database, Aug. 1993, pp. 26-39.

Fellbaum, Christiane, "English Verbs as a Semantic Net", Published in Revised Version of Introduction to WordNet: An On-line Lexical Database, Aug. 1993, pp. 40-61.

Klein, et al., "Accurate Unlexicalized Parsing", In Proceedings of the 41st Annual Meeting of the Association for Computational Linguistics, Jul. 7-12, 2003, Sapporo Convention Center, Sapporo, Japan, Jul. 7, 2003, 8 Pages.

Klein, et al., "Fast Exact Inference with a Factored Model for Natural Language Parsing", In Proceedings of NIPS 2002, Advances in Neural Information Processing Systems 15 Neural Information Processing Systems,Vancouver, British Columbia, Canada, Dec. 9, 2002, 8 Pages.

Mikolov, et al., "Distributed Representations of Words and Phrases and their Compositionality", In Proceedings of Advances in Neural Information Processing Systems 26 (NIPS 2013), 2013 , pp. 1-9.

Miller, George, A., "Nouns in WordNet: A Lexical Inheritance System", Published in Revised version of Introduction to WordNet: An On-line Lexical Database, Aug. 1993, pp. 10-25.

Nivre, et al., "Universal Dependencies v1: A Multilingual Treebank Collection", In Proceedings of the Tenth International Conference on Language Resources and Evaluation LREC 2016, Portoroz, Slovenia,, May 23, 2016, 8 Pages.

Pennington, et al., "GloVe: Global Vectors for Word Representation", In Proceedings of the 2014 Conference on Empirical Methods in Natural Language Processing, EMNLP 2014, Doha, Qatar, A meeting of SIGDAT, a Special Interest Group of the ACL, Oct. 25, 2014, 12 Pages.

Rafferty, et al., "Parsing Three German Treebanks: Lexicalized and Unlexicalized Baselines", In Proceedings of the Workshop on Parsing German, Columbus, Ohio, Jun. 20, 2008, 7 Pages.

Schuster, et al., "Enhanced English Universal Dependencies: An Improved Representation for Natural Language Understanding Tasks", In Proceedings of the Tenth International Conference on Language Resources and Evaluation LREC 2016, May 23, 2016, 8 Pages.

Socher, et al., "Parsing with Compositional Vector Grammars", In Proceedings of the 51st Annual Meeting of the Association for Computational Linguistics, ACL 2013, Sofia, Bulgaria, vol. 1: Long Papers., Aug. 4, 2013, 11 Pages.

* cited by examiner accountant alone asked attempt ball bank caught cheque clerk deposit detective dollars door draw everything far felt fifty fifty-six gave idea idiot keep knew large looked man manager money month morning open pale pinkerton pocket quick rattle room safe seemed sight six someone something think truth voice wicket wretched write

Figure 1 (Prior Art)

CONTEXT-SENSITIVE SALIENT KEYWORD UNIT SURFACING FOR MULTI-LANGUAGE SURVEY COMMENTS

TECHNICAL FIELD

The present disclosure generally relates to computer-implemented natural language processing. More specifically, the present disclosure relates to computer-implemented techniques for context-sensitive identification and surfacing of salient keyword units in a text corpus of survey comments that spans multiple written languages.

BACKGROUND

It can be difficult to assess and improve the health of a company. Company leaders need visibility into employee engagement, insight to focus on what is most important, and guidance to take effective action. To this end, web-based computing platforms exist to solicit and obtain text comments from employees. These platforms allow the company to present prompts for comments to employees in a web-based user interface. Using the web-based user interface, the employees can provide comments about the company and the employment experience in a free-form text format.

Management and/or human resources personnel of the company may review the employee-submitted text comments. Such review may be conducted to assess and improve the level of employee engagement. One challenge for companies using the platforms is simply the amount of comments that may need to be reviewed by a human. Thus, companies would appreciate solutions that help them more quickly identify the salient themes and concepts in the comments.

One-way computers can aide in the human review of employee survey comments is by automatically generating tag clouds. A tag cloud, which is sometimes called a word cloud or a visual weighted list, is a useful way to visualize free-form text. Typically, each "tag" is a word from the text and is visually presented in a font size and/or color that represents the relative importance of the word to the text. For example, FIG. 1 (prior art) depicts a tag cloud visualization of text of the short story by Stephen Leacock entitled "My Financial Career" published in the *The Word's Wit and Humor: An Encyclopedia in 15 Volumes,* 1906.

According to the tag cloud visualization of FIG. 1, the word "bank" has a greater relative importance to the short story as indicated by its relatively large font size in the tag cloud. As such, one viewing the tag cloud, in the context of other tags in the tag cloud (e.g., "Accountant"), might reasonably infer, even before even reading the story, that it pertains particularly to a bank, as in a financial institution that accepts monetary deposits and extends credit.

A challenge with generating tag cloud visualizations of employee survey comments is that the comments may be submitted in multiple different written languages yet persons reviewing the comments may wish to review the comments in their preferred written language. For example, consider a company that has divisions around the globe including in Germany, the United States, and China. Employees in Germany may submit survey comments in German, employees in the United States may submit survey comments in English, and employees in China may submit survey comments in Standard Official Chinese (Mandarin). However, executives in Germany, wishing to have a comprehensive view of employee engagement across all divisions of the company around the world, may be able to understand written English and/or Chinese only poorly, or not at all. As such, these German executives would appreciate having a tag clouds that visualize the multi-language survey comments using German words as the tags.

One way to do this is to use a natural language machine translator to translate each word of a tag cloud in a source language (e.g., English) to a corresponding translated word in a target language (e.g., Chinese). One example of a natural language machine translator capable of translating text between different language pairs is the Cloud Translation API offered by Google, Inc. of Mountain View, Calif. More information on the Google Cloud Translation API is available on the internet at /translate in the cloud.google.com domain, the entire contents of which is hereby incorporated by reference.

There is a significant deficiency of using only this approach, however. In particular, the inter-language translations made by a natural language machine translator from one word to another may be made out-of-context. For example, employees of a United States division of a Chinese-operated company may submit English-language comments that use the term "career" to refer to career development and advancement. A natural language translator may translate the English word "career" to the simplified Chinese "事业," which roughly means "cause" in English, where, in context, the simplified Chinese "生涯," is a more accurate translation. Thus, a Chinese executive viewing a tag cloud that contains a Chinese word translated using a natural language machine translator from the English word "career" may incorrectly infer from the tag cloud that her American employees are commenting on the company's mission, cause, or enterprise, rather than correctly inferring that her American employees are expressing concern or interest about their career development.

Accordingly, what is needed are computer-implemented techniques for surfacing salient keyword units in multi-language survey comments that are more context-sensitive. The present invention addresses this and other needs. The present invention may be used in conjunction with, or instead of, other techniques for surfacing salient keyword units in multi-language survey comments.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

BRIEF DESCRIPTION OF THE DRAWINGS

In the drawings:

FIG. 1 (Prior Art) is a tag cloud visualization of certain text.

DETAILED DESCRIPTION

Figure 2:
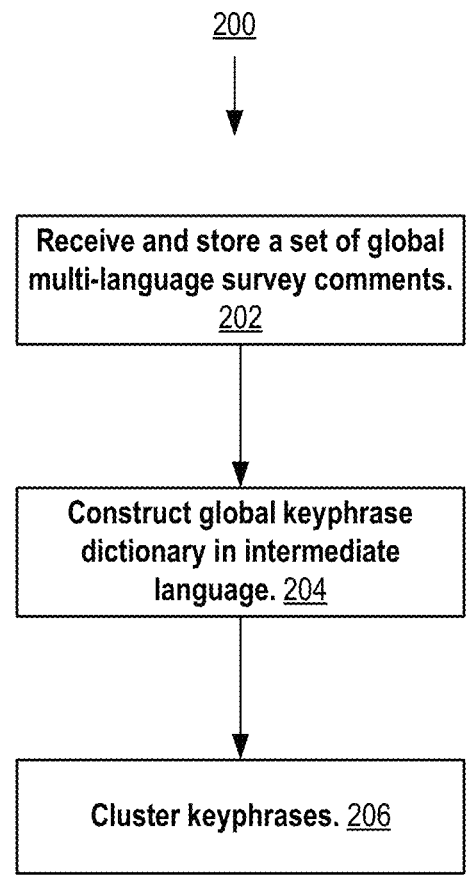
FIG. 2 is a process for constructing a global keyword unit dictionary in an intermediate language and for clustering salient keyword units, according to an implementation of the present invention.

In the following description, for the purposes of explanation, numerous specific details are set forth in order to provide a thorough understanding of implementations of the present invention. It will be apparent, however, that an implementation may be practiced without these specific details. In other instances, well-known structures and devices are shown in block diagram form in order to avoid unnecessarily obscuring an implementation.

Context-Sensitive Salient Keyword Unit Surfacing for Multi-Language Survey Comments Computer-based implementations of context-sensitive salient keyword unit surfacing for multi-language comments are disclosed. In an implementation, a set of target keyword units in a target written language (e.g., Chinese) are caused by a computing system to be presented in a graphical user interface such as, for example, as part of a tag cloud or the like. The set of target keyword units are determined by the system by mapping a set of source keyword units in an intermediate written language (e.g., English) to the set of target keyword units. For example, the set of source keyword units may be those selected for inclusion in an intermediate language tag cloud that visualizes a set of source multi-language survey comments. The set of source multi-language survey comments may include all survey comments submitted to the system, or a selected subset thereof. For example, the set of source multi-language survey comments may include all survey comments submitted to the system with certain known attributes (e.g., comments known to be submitted by female engineers at a particular company).

To map the set of source keyword units to the set of target keyword units, the system uses an intermediate language-to-target language dictionary. The intermediate language-to-target language dictionary maps keyword units in the intermediate language to corresponding keyword units in the target language where mappings are determined in a context-sensitive manner. To do this context-sensitive mapping, the intermediate-to-target language dictionary is constructed by the system based on an intermediate language dictionary and a set of target survey comments submitted to the system in the target language. For example, the set of target survey comments may be all survey comments submitted to the system in the target language, or a selected subset thereof.

For the context-sensitive mapping, the set of target survey comments are first translated to the intermediate language by a natural language machine translator on a comment-by-comment basis to produce a corresponding set of translated target survey comments in the intermediate language. Because the set of target survey comments are translated by the natural language machine translator to the intermediate language on a comment-by-comment basis with each target survey comment translated by the natural language machine translator as a whole, as opposed to translating on a keyword unit-by-keyword unit basis, the resulting translation by the natural language machine translator takes into account the entire context of the survey comment, and thus is more context-sensitive. For example, whereas the natural language machine translator may translate the single English word "career" to the simplified Chinese "事业," which roughly means "cause" in English, the natural language machine translator may translate the English sentence "I would like a very long career," to the simplified Chinese "我想要很长的职业生涯," which contains the more accurate translation of "career" in context.

Once the set of target survey comments are translated to the set of translated target survey comments, the system analyzes the sets for occurrences of translation pairs where each translation pair includes a unique occurrence of a particular intermediate language keyword unit in the set of translated target survey comments and a unique occurrence of a particular target language keyword unit in the set of target survey comments. The more often the same translation pair occurs in the sets, the higher the confidence assigned by the system that the particular intermediate language keyword unit of the translation pair is an accurate translation in context of the particular target language keyword unit of the translation pair. For example, consider a set of Chinese-language target survey comments that is translated using a natural language machine translator on a comment-by-comment basis to a corresponding set of English-language translated target survey comments. If the translation pair ("生涯", "career") occurs more than a threshold number of times in the sets, then the system may assign a higher confidence that the accurate translation of the English-language keyword unit "career" is the Chinese language keyword unit "生涯."

Relatively frequently occurring translation pairs may be included as a mapping in the intermediate language-to-target language dictionary. For example, the frequently occurring translation pair translation pair ("生涯", "career") in the example above may be included in an English language-to-Chinese language dictionary as a mapping that maps the English language keyword unit "career" to the Chinese language keyword unit "生涯." When translating the set of source keyword units to the set of target keyword units, each keyword unit in the set of source keyword units may be used as a key into the intermediate language-to-target language dictionary to determine the keyword unit in the target language to which the source keyword unit is mapped by the dictionary. The keyword unit in the target language may then be included in the set of target keyword units. Because the intermediate language-to-target language dictionary provides a more context-sensitive mapping of intermediate language keywords to target language keywords based on the more context sensitive natural language machine translation of the target survey comments, the set of target keyword units represents a more context sensitive translation of the set of source keyword units.

Figure 3:
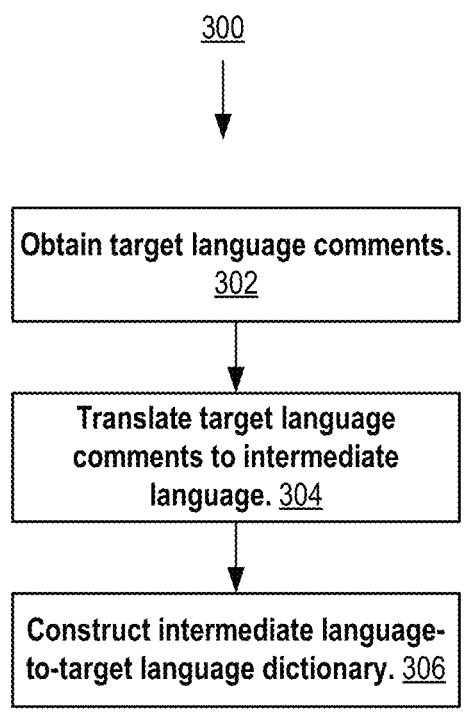
FIG. 3 is a process for constructing an intermediate language-to-target language keyword unit dictionary, according to an implementation of the present invention.
Figure 4:
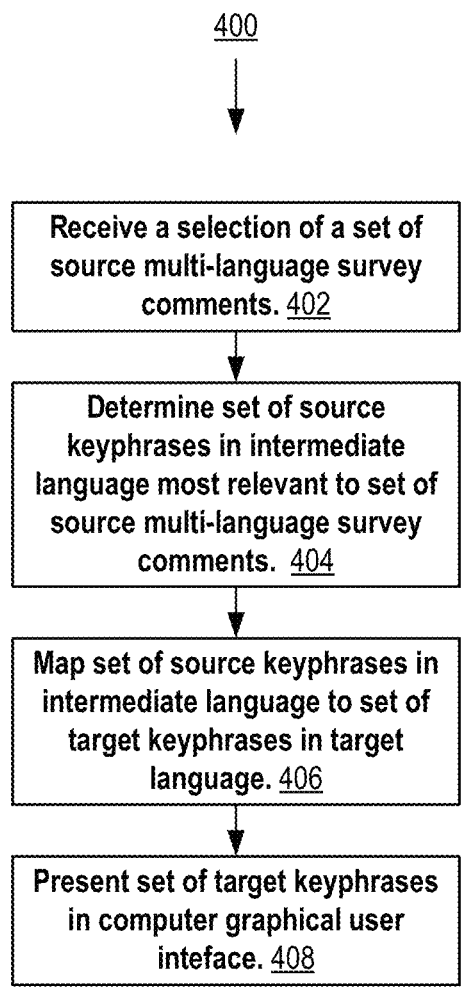
FIG. 4 is a process for context-sensitive mapping of a set of source keyword units in an intermediate language to a set of target keyword units in a target language, according to an implementation of the present invention.

Example Processes for Context-Sensitive Salient Keyword Unit Surfacing for Multi-Language Comments FIG. 2, FIG. 3, and FIG. 4 are processes 200, 300, 400 for context-sensitive salient keyword unit surfacing for multi-language comments, according to an implementation of the present invention. In particular, FIG. 2 is process 200 for constructing a global keyword unit dictionary in an intermediate language and clustering salient keyword units, according to an implementation of the present invention. FIG. 3 is process 300 for constructing an intermediate language-to-target language keyword unit dictionary, according to an implementation of the present invention. FIG. 4 is process 400 for context-sensitive translation of a set of source keyword units in an intermediate language to a set of target keyword units in a target language, according to an implementation of the present invention.

For each performance of process 200, process 300 and process 400 may be performed multiple times each. For example, process 300 can be performed for each of multiple target languages (e.g., Chinese, Spanish, French, German, Japanese, etc.) Process 400 can be performed for each of multiple sets of source keyword units. For example, each set of source keyword units may correspond to a different tag cloud in the intermediate language.

Global Multi-Language Survey Comments

Turning first to FIG. 2, it is process 200 for constructing a global keyword unit dictionary in an intermediate language and for clustering salient keyword units, according to an implementation of the present invention. Process 200 includes the operations of receiving and storing a set of global multi-language survey comments 202, constructing a global keyword unit dictionary based on the set of global multi-language survey comments 204, and clustering salient keyword units of the constructed global keyword unit dictionary together based on linguistic and semantic similarity 206. As a result of process 200, a set of concept keyword units are determined corresponding to the clusters identified where each cluster represent a distinct salient concept expressed in the set of global multi-language survey comments.

Returning again to the top of process 200, at operation 202, the system receives and stores a set of global multi-language survey comments. The set of global multi-language survey comments may be received by the system over one or more data communications networks from the end-user computing devices of users of the system. The users may be associated with a particular company, corporation, department, school, division, or other particular organization. The system may store 202 the received 202 set of global multi-language survey comments in computer storage media.

It should be noted that the system may be configured to receive and store 202 multiple sets of global multi-language survey comments from users belonging to different organizations. And the system may be configured to perform process 200 for each such set. For example, system may be configured to received and store 202 multiple sets of global multi-language survey comments from multiple different companies or organizations.

The set of global survey comments received and stored 202 may be submitted to the system by users of the system around the world. For example, the system may have a federated configuration where there is an instance of a survey commenting system at different locations around the world. At each such instance, the survey commenting system there may provide a web-based graphical user interface that can be accessed at users' personal computing devices using a client application such as a web browser application or a mobile application or other client application that uses web-based networking protocols (e.g., IP, HTTP, HTTPS, etc.) to communicate with a server computer and to send and receive information to and from the server.

The web-based graphical user interface may present various survey questions to users soliciting their response to the questions. The survey questions may be directed to various topics including directed to soliciting comments that are useful for assessing the level of organizational engagement by members of the organization. Different sets of survey questions may be presented to different sets of users along demographic and/or organization lines. For example, a set of survey questions may be presented to only female engineers in a company, or just to managers, etc. However, it is also possible to present a set of survey questions to all members of an organization. As such, the set of global multi-language survey comments received and stored 202 may contain survey comments to survey questions directed to all members of the organization, survey comments directed to a selected subset of all members, or a combination survey comments directed to all members and survey comments directed to selected member subsets.

Comments provided by users to survey questions may be provided in a free-form text format. A survey question may have a predetermined limit on the number of text characters that can be entered as the comment. For example, the predetermined limit may be 1,000 characters, as just an example, but may be more or less according to the requirements of the particular implementation at hand. Thus, each survey comment may be viewed as a sequence of text characters up to a maximum predetermined length.

Survey comments may be submitted to the system in multiple different languages. For example, the set of global multi-language survey comments received and stored 202 may include comments written in English, Chinese, German, Japanese, and Spanish, or other written languages, as just some examples.

Global Keyword Unit Dictionary

At operation 204, the system constructs a global keyword unit dictionary based on the set of global multi-language comments received and stored 202. When constructed, the global keyword unit dictionary contains salient keyword units about the set of global multi-language comments but in the intermediate language.

The salient keyword units reflect significant themes and concepts identified in the set of global multi-language survey comments. For example, the salient keyword units for survey comments directed to employee benefits may include, as just some examples, "401K matching," "paternity leave," "profit sharing," or the like.

It should be understood that reference herein to "keyword unit" is intended to encompass a single word as well as word phrases. A word phrase is a group of words that express a concept and that may be used as a unit within a sentence. There are different types of words (e.g., nouns, verbs, adjectives, adverbs, pronouns, prepositions, conjunctions, etc.). Similarly, there are different types of word phrases (e.g., noun phrases ("the sports car"), verb phrases ("have been sleeping for a long time"), gerund phrases ("going for ice cream"), infinitive phrases ("to donate time or money"), etc.). Thus, a keyword unit is not limited to only a single word but may include multiple word phrases (e.g., "skill set") including punctuated/hyphenated multi-word phrases (e.g., "long-term care insurance plan") or other punctuated multi-word phrases that are treated as a logical unit (e.g., "glasses/contacts").

In an implementation, the global keyword unit dictionary is constructed 204 by the system in an intermediate language, to simplify construction. In an implementation, the intermediate language is English due to the wide availability of software tools for processing English-language text but may be another language according to the requirements of the particular implementation at hand. As such, the salient keyword units of the global keyword unit dictionary may all be in the intermediate language.

To facilitate construction 204 of the global keyword unit dictionary, those survey comments of the set of global multi-language survey comments that are not already in the intermediate language may be translated by the system to the intermediate language using a natural language machine translator. Various different natural language machine translators may be used, and no particular natural language machine translator is required. One example of a suitable natural language machine translator is the Cloud Translation API offered by Google, Inc. of Mountain View, Calif. More information on the Google Cloud Translation API is available on the internet at /translate in the cloud.google.com domain, the entire contents of which is hereby incorporated by reference.

While the Google Cloud Translation API is used in an implementation, another natural language machine translator may be used that offers a programmatic API to automatically convert one natural language text body into another, while aiming to preserve the meaning of the input text and produce fluent text in the output language. The natural language machine translator may use a combination of techniques including statistical techniques, deep linguistic analyses, and/or large-scale empirical techniques.

Construction 204 of the global keyword unit dictionary by the system may occur in a stream processing manner. That is, the set of global multi-language survey comments may be processed incrementally (e.g., one at a time or in small batches) such that all of the set of global multi-language survey comments need not be stored in volatile memory at once. The stream processing may include using the natural language machine translator to translate a survey comment that was not submitted in the intermediate language to the intermediate language and to parse and analyze the intermediate language survey comment to identify candidate keyword units in the comment. The candidate keyword units are keyword units that are considered for inclusion in the global keyword unit dictionary, as described in greater detail below. As a result of the processing of the set of global multi-language survey comments, a set of candidate keyword units and a set of global intermediate language survey comments is generated.

When translating a survey comment that is not in the intermediate language to a survey comment that is in the intermediate language, the survey comment may be translated by the natural language machine translator as a whole/ in its entirety so that the translation is performed in context of the entire survey comment and to better preserve the meaning of the input text and produce a more fluent translation as output. In an implementation, the survey comment is normalized before the normalized version is translated as a whole/in its entirety. For example, stop words/common words may be removed from the survey comment and/or words of the survey comment stemmed and/or lemmatized.

When the system parses survey comments in the set of global intermediate language survey comments to identify candidate keyword units, candidate keyword units may be identified by the system in text of a survey comment based on a variety of different parsing techniques ranging from the very simple technique of identifying tokens based on separating whitespace or other token separating characters, to the more complex regular expression matching, to sophisticated probabilistic natural language parsing techniques, or a combination of these parsing techniques.

In an implementation, probabilistic natural language parsing techniques in combination with parts-of-speech (POS) tagging are employed by the system to identify candidate keyword units in a survey comment. Examples of probabilistic natural language parsing techniques that may be employed for this purpose are described in the following papers, the entire contents of each of which are hereby incorporated by reference: Danqi Chen and Christopher D Manning, 2014, "A Fast and Accurate Dependency Parser using Neural Networks," Proceedings of EMNLP 2014; Richard Socher, John Bauer, Christopher D. Manning and Andrew Y. Ng, 2013, "Parsing With Compositional Vector Grammars," Proceedings of ACL 2013; Dan Klein and Christopher D. Manning, 2003, "Accurate Unlexicalized Parsing," Proceedings of the 41st Meeting of the Association for Computational Linguistics, pp. 423-430; Dan Klein and Christopher D. Manning, 2003, "Fast Exact Inference with a Factored Model for Natural Language Parsing," In Advances in Neural Information Processing Systems 15 (NIPS 2002), Cambridge, Mass.: MIT Press, pp. 3-10; "Joakim Nivre, Marie-Catherine de Marneffe, Filip Ginter, Yoav Goldberg, Jan Hajič, Christopher D. Manning, Ryan McDonald, Slav Petrov, Sampo Pyysalo, Natalia Silveira, Reut Tsarfaty, and Daniel Zeman, 2016, "Universal Dependencies v1: A Multilingual Treebank Collection," In LREC 2016; Sebastian Schuster and Christopher D. Manning, 2016, "Enhanced English Universal Dependencies: An Improved Representation for Natural Language Understanding Tasks," In LREC 2016; Marie-Catherine de Marneffe, Bill MacCartney and Christopher D. Manning, 2006, "Generating Typed Dependency Parses from Phrase Structure Parses," In LREC 2006. Another type of probabilistic parser that may be used is the Shift-Reduce Constituency parser by John Bauer, more information for which is available on the interne at /software/srparser.html in the nlp.stanford.edu domain, the entire contents of which is hereby incorporated by reference.

The keyword units that are parsed by the system from the set of global intermediate language survey comments and included in the set of candidate keyword units may exclude very common or language-specific stop words (e.g., "a", "an", "and", "are", "as", "at", "be", "by", "for", "from", "has", "he", "in", "is", "it", "its", "of", "on", "that", "the", "to", "was", "were", "will", "with", etc. for the English language). Parsed keyword units included in the set of candidate keyword units may be normalized by the system. Normalization may involve the use of equivalence classes to account for superficial differences in semantically the same keyword unit. For example, the parsed keyword unit "anti-discriminatory" and "antidiscriminatory" may be both mapped to the keyword unit "antidiscriminatory" as part of normalization. As part of normalization, parsed keyword units may be case-folded (i.e., all characters of the keyword unit reduced to lowercase), stemmed, and/or lemmatized.

To identify salient keyword units to include in the global keyword unit dictionary from among the set of candidate keyword units extracted from the set of global intermediate language survey comments, the mutual information and entropy of each candidate keyword unit may be measured by the system. Candidate keyword units that have high mutual information and low entropy may be included by the system in the global keyword unit dictionary. For example, the candidate keyword units of the top-N number of candidate keyword unit collocations in the set of global intermediate language survey comments, as measured using pointwise mutual information, that have an entropy measure below a threshold can be included by the system in the global keyword unit dictionary. The entropy measure of a candidate keyword unit may be based on the number of survey comments of the set of global intermediate language survey comments that the candidate keyword unit appears. A candidate keyword unit that appears in more of the survey comments is less informational and has a higher entropy measure, while a candidate keyword unit that appears in fewer of the survey comments is more informational and has a lower entropy measure. For example, for a set of employee survey comments, it might be expected for the keyword unit "manager" to have a relatively high mutual information measure but also a relatively high entropy measure.

While in an implementation a mutual information measure such as pointwise mutual information is used by the system to measure the importance of a candidate keyword unit to the set of global intermediate language survey comments, one or more other measures that measure the importance of the candidate keyword unit to the set of global intermediate language survey comments is used by the system in addition to or instead of a mutual information measure. For example, a term frequency/inverse document frequency (TF/IDF) measure of a candidate keyword may be used by the system in addition to or instead of a mutual information measure to determine the importance of the candidate keyword to the set of global intermediate language survey comments.

In an implementation, construction 204 of global keyword unit dictionary by the system involves human curation. For example, an initial global keyword unit dictionary may be automatically constructed by the system. Then, a human curator may review the initial set (e.g., using a web-based graphical user interface) and add (via user input to the system) additional keyword units to the dictionary that are considered salient of the set of global intermediate language survey comments and/or remove (via user input to the system) keyword units from the dictionary that are not considered salient of the set of the global intermediate language survey comments.

Clustering Salient Keyword Units

The salient keyword units included in global keyword unit dictionary may have some linguistic and semantic redundancy or overlap. For example, the salient keyword units may include multiple different keyword units with essentially the same meaning or that are related to a common concept. For example, the salient keyword units may include the keyword units "401k," "401(K)", "401(k) matching," "401-k profit sharing," which are all related to 401(k) qualified employee-sponsored retirement plans. Linguistic variants of the same concept are also possible as in "skill set" and "skillset." Misspellings and slang are also possible as in "skillz" and "skills."

Given this linguistic and semantic redundancy in the salient keyword units included in the global keyword unit dictionary, salient keyword units included in global keyword unit dictionary may be clustered 206 by the system based on linguistic and/or semantic similarity. Various different techniques may be used by the system to determine if keyword units are linguistic and/or semantically related. For example, fuzzy matching (e.g., based on edit distance) may be used by the system to detect misspelling or spelling variants which may be clustered together by the system. Keyword units that are determined by the system to belong to the same synset according to an English-language lexical database may be considered by the system to be synonyms of each other and thus clustered together by the system. One example of a suitable English-language lexical database that may be used by the system for this purpose is the WordNet database available on the internet in the domain wordnet.princeton.edu, the entire contents of which is hereby incorporated by reference. Keyword units may also be converted by the system to word vectors in an embedding space and word vectors that are close in distance in the embedding space may be clustered together by the system. Distance between word vectors in the embedding space may be measured according to a distance measure such as, for example, cosine similarity, or the like. Some examples of an embedding function that may be used by the system to obtain word vector representations of keyword units are the Word2vec embedding function and the GloVe embedding function. The Word2vec and GloVe embedding functions provide pre-trained word vectors for a vocabulary of words. However, it is also possible for the system to learn embeddings from a corpus of documents such as, for example, the set of global intermediate language survey comments. More information on word vectors and Word2vec is available in the paper by Thomas Mikolov, Kai Chen, Gregory S. Corrado, and Jeffrey Dean, 2013, "Efficient Estimation of Word Representations in Vector Space," Computing Research Repository, arXiv:1301.3781, the entire contents of which is hereby incorporated by reference. More information on GloVe is available in the paper by Jeffrey Pennington, Richard Socher, and Christopher D. Manning, 2014, "GloVe: Global Vectors for Word Representation," Proceedings of the 2014 Conference on Empirical Methods in Natural Language Processing (EMNLP)," the entire contents of which is hereby incorporated by reference.

As a result of clustering 206 the salient keyword units of constructed 204 global keyword unit dictionary, there may be a number of resulting clusters. Each represents a salient concept expressed in the set of global intermediate language survey comments. In an implementation, a concept keyword unit is generated for each cluster based on the salient keyword units of the cluster. For example, the concept keyword unit for a cluster comprising the salient keyword units "401k," "401(K)", "401(k) matching," and "401-k profit sharing" might be "401(k)."

Various different techniques may be used to determine a concept keyword unit for a cluster based on the salient keyword units that belong to the cluster and an implementation is not limited to any particular technique. For example, a single heuristic such as the most frequent keyword unit or most frequent lexical token among the salient keyword phrases of the cluster may be selected by the system as the concept keyword unit, possibly after normalization of the keyword unit or token. It is also possible for the concept keyword unit to be selected or assigned by a human user. For example, the system may present a web-based graphical user interface that presents all of the salient keyword units selected for inclusion in a particular cluster and the user may enter/edit a concept keyword unit for the cluster and/or select one of the salient keyword units of the cluster to be the concept keyword unit.

Constructing the Intermediate Language-to-Target Language Dictionary

Turning next to FIG. 3, it is process 300 for constructing an intermediate language-to-target language dictionary, according to an implementation of the present invention. The dictionary may be used to map keyword units in the intermediate language to keyword units in the target language in a context-sensitive manner. For example, the dictionary may be used to map keyword units of an intermediate language tag cloud to keyword units that can be included in a corresponding target language tag cloud. Because of the context-sensitive mapping by the dictionary, the keyword units included in the corresponding target language tag cloud better preserve the meaning of the corresponding keyword units of the intermediate language tag cloud in the context of the survey comments from which the corresponding keyword units are derived.

Process 300 includes the operations of the system obtaining a set of target language survey comments 302, the system translating the set of target language survey comments to the intermediate language to produce a set of translated target language survey comments 304, and the system constructing the intermediate language-to-target language dictionary based on the set of target language survey comments and the set of translated target language survey comments. Process 300 may be performed by the system multiple times for different target languages to generate intermediate language-to-target language dictionaries for different target languages.

Returning now to the top of FIG. 3, at operation 302, a set of target language survey comments is obtained by the system. The set of target language comments may be a subset of the set of global multi-language survey comments. For example, the set of target language comments may be all survey comments of the set of global multi-language survey comments in the target language, or a selected subset thereof. Obtaining 302 the set of target language survey comments may involve merely identifying which of the set of global multi-language survey comments received and stored 202 are selected for inclusion in the set of target language survey comments. Alternatively, a copy of the selected survey comments may be made and stored in a storage media for further processing in accordance with process 300.

At operation 304, the set of target language survey comments are translated by the system using a natural language machine translator from the target language to the intermediate language to produce a set of corresponding translated target language survey comments in the intermediate language. Various different natural language machine translators may be used, and no particular natural language machine translator is required. For example, the Google Cloud Translation API may be used.

When translating a survey comment of the set of target language survey comments to a survey comment in the intermediate language that is included in the set of translated target language survey comments, the survey comment may be translated by the natural language machine translator as a whole/in its entirety so that the translation is performed in context of the entire survey comment and to better preserve the meaning of the input text and produce a more fluent translation as output. In an implementation, the survey comment is normalized before the normalized version is translated as a whole/in its entirety. For example, stop words/common words may be removed from the survey comment and/or words of the survey comment stemmed and/or lemmatized.

As a result of operation 304, the set of translated target language survey comments are translated in context from the set of target language survey comments.

At operation 306, an intermediate language-to-target language dictionary is constructed by the system. Each of the set of target language survey comments and the set of translated target language survey comments is parsed and analyzed into a respective bag of keyword units. In particular, the set of target language survey comments is parsed and analyzed in the target language into a bag of target language keyword units and the set of translated target language survey comments is parsed and analyzed in the intermediate language into a bag of intermediate language keyword units.

Parsing and analyzing the set of translated target language survey comments in the intermediate language may involve identifying intermediate language keyword units in the set using one or more of the simple, regular expression, and/or probabilistic parsing techniques discussed above. Analogously, parsing and analyzing the set of target language survey comments in the target language may involve identifying target language keyword units in the set of target language survey comments using one or more of the simple, regular expression, and/or probabilistic parsing techniques discussed above that are adapted for the target language. For example, probabilistic parsing of German, Chinese, Arabic, French, Spanish survey comments may be supported by techniques described in the following papers, the entire contents of each of which is hereby incorporated by reference: Anna Rafferty and Christopher D. Manning, 2008, "Parsing Three German Treebanks: Lexicalized and Unlexicalized Baselines," In *ACL Workshop on Parsing German*; Roger Levy and Christopher D. Manning, 2003, "Is it harder to parse Chinese, or the Chinese Treebank?" *ACL* 2003, pp. 439-446; Pi-Chuan Chang, Huihsin Tseng, Dan Jurafsky, and Christopher D. Manning, 2009, "Discriminative Reordering with Chinese Grammatical Relations Features," In *Proceedings of the Third Workshop on Syntax and Structure in Statistical Translation*; Spence Green and Christopher D. Manning, 2010, "Better Arabic Parsing: Baselines, Evaluations, and Analysis," In *COLING* 2010; Spence Green, Marie-Catherine de Marneffe, John Bauer, and Christopher D. Manning, 2010, "Multiword Expression Identification with Tree Substitution Grammars: A Parsing tour de force with French," In *EMNLP* 2011. The Spanish language may be supported according to the work by Jon Gauthier, more information about which is available on the interne at /software/spanish-faq.html in the nlp.stanford.edu domain, the entire contents of which is hereby incorporated by reference.

Next, translation pairs are identified by the system from the bags of keyword units. Each translation pair includes an occurrence of an intermediate language keyword unit identified in the set of translated target language survey comments and a corresponding occurrence of a target language keyword unit identified in the set of target language keyword units. The occurrence of the intermediate language keyword unit and the corresponding occurrence of the target language keyword unit may be with respect to a particular target language survey comment in the set of target language survey comments. That is, the occurrence of the target language survey comment may be in the particular target language survey comment and the corresponding occurrence of the intermediate language survey comment may be in the intermediate language survey comment produced by the natural language machine translator from the particular target language survey comment. For example, consider the target language survey comment in Chinese of "我想要一个很长的职业生涯," which is translated to the translated target language survey comment in English of "I want a long career." The translation pair ("生涯," career") may be identified in context from these corresponding survey comments.

If a given translation pair occurs frequently enough, it may be included by the system in the intermediate language-to-target language dictionary. What is frequent enough may be determined empirically according to the requirements of the particular implementation at hand. In general, however, frequently enough means more than once. For example, as few as three occurrences of the same translation pair may be considered frequent enough to be included in the intermediate language-to-target language dictionary. When adding a translation pair that occurs frequently enough to the dictionary, the intermediate language keyword unit of the translation pair may be mapped to the target language keyword unit of the translation pair. For example, for the translation pair ("生涯," career") where Chinese is the target language and English is the intermediate language, then the English language keyword unit "career" may be mapped to the Chinese language keyword unit "生涯."

In an implementation, the translation pairs identified for inclusion in the intermediate language-to-target language dictionary are curatable by a human via a graphical user interface. For example, the graphical user interface may allow a human curator with appropriate user input to add new mappings to the dictionary and/or remove existing mappings from the dictionary.

Context-Sensitive Mapping of Source Keyword Units to Target Keyword Units

After the concept keyword units are determined according to process 200 and an intermediate language-to-target language dictionary is formed according to process 300, a set of source keyword units in the intermediate language may be mapped to a corresponding set of target keyword units in the target language. FIG. 4 is process 400 for context-sensitive translation of a set of source keyword units in an intermediate language to a set of target keyword units in a target language, according to an implementation of the present invention.

Process 400 includes the operations of the system receiving a selection of a set of source multi-language survey comments 402, the system determining a set of source keyword units in the intermediate language that are most relevant to the selected set of source multi-language survey comments 404, the system mapping the set of source keyword units in the intermediate language to the set of target keyword units in the target language 406, and the system causing the set of target keyword units to be presented in the target language in a computer graphical user interface 408.

Returning to the top of process 400, at operation 402, the system receives a selection of a set of source multi-language survey comments. The set of source multi-language survey comments may be a selected subset of the set of global multi-language survey comments received and stored 202. The selected subset may be selected based on one or more attribute values of the set of global multi-language survey comments. That is, each survey comment may be associated and indexed by one or more attribute values. The attribute values associated with a survey comment may reflect one or more characteristics of the commenter who made the survey comment and/or one or more characteristics of the survey question that prompted the commenter to submit the survey comment. The one or more characteristics of the commenter may include demographic characteristics (e.g., age, gender, generation, geographic location, etc.) and/or one or more organizational characteristics (e.g., job title, job role, job function, etc.), for example. The one or more characteristics of the survey question may include the organizational aspect that the survey question is directed to (e.g., corporate culture, employee inclusion, management bias, employee ethics, employee autonomy, employee growth, corporate mission, etc.) and/or the time period of the survey question (e.g., when the survey question was presented or answered). For example, the selected subset of survey comments may include any of the following sets of multi-language survey comments, as just a few examples:

All multi-language survey comments,
All multi-language survey comments by female employees,
All multi-language survey comments by female engineers,
All multi-language survey comments directed survey questions about corporate culture by female engineers, etc.

After selection 402 of the set of source multi-language survey comments 402, a set of source keyword units in the intermediate language is determined 404 by the system that are most relevant to the selected set of multi-language survey comments. To do this, each survey comment in the set of source multi-language survey comments may be associated with keyword units by importance scores. An importance score that associates a survey comment to a keyword unit reflects the importance of the keyword unit to the survey comment according to an importance measure such as, for example, a term frequency (e.g., the number of times the keyword unit appears in the survey comment), a mutual information measure, and/or a TF/IDF measure, or some combination thereof.

In an implementation, the keyword units associated with a survey comment include the concept keyword units of the clusters determined 206 in process 200, as described above. For efficient processing, the set of source multi-language survey comments may be associated with the importance scores for the concept keyword units by a matrix where the importance score for a particular survey comment and a particular concept keyword unit is at the intersection in the matrix of the row (or column) for the particular survey comment and the column (or row) for the particular concept keyword unit.

In an implementation, the set of source keyword units are determined 404 according to which keyword units, of the concept keyword units associated with the set of source multi-language survey comments by importance scores, according to (1) coverage of the set of source multi-language survey comments and (2) pairwise mutual information.

The coverage of a keyword unit of the set of source multi-language survey comment may be computed as the percentage of the set of source multi-language survey comments in which the keyword unit appears. A keyword unit may be considered by the system to appear in a survey comment if it has an importance score for the survey comment above a minimum threshold (e.g., zero).

Keyword units may be grouped into tiers by their salient coverage. The highest tier providing the best/most salient coverage may be those keyword unit than provide within a range of coverage that reflect particularly salient concepts in the set of source multi-language survey comments.

In an implementation, the most salient concepts have not much more than a minimum threshold coverage (e.g., 2%) and saliency decreases as the coverage increases above the minimum threshold coverage. This reflects the idea that concepts that have high coverage are not particularly salient. For example, the keyword unit "manager" may appear in many of the survey comments directed to survey questions about management at an organization. This keyword unit is not particularly salient about the concepts expressed in the survey comments as it would be expected for most of the commenters to refer to their manager. However, a keyword unit such as "bias" or "ethics" that appears in relatively small percentage of the survey comments (e.g., 10%) may be salient of bias or ethics problem in the organization.

As mentioned, keyword units associated with the set of source multi-language survey comments by respective importance scores may be grouped into tiers where each tier corresponds to a range of coverage. For example, the top tier may include keyword units that have between 2% and 5% of coverage, the next tier may include keyword units having between 5% and 10% of coverage, and the next tier after that may include keyword units having between 10% and 15%, etc. The number of tiers and the coverage ranges of each tier may vary according to the requirements of the particular implementation at hand. For example, the number of tiers and the corresponding ranges may be determined empirically.

Keyword units within each tier may be ranked according to pairwise mutual information. In an implementation, pairwise mutual information for a keyword unit is measured in accordance with the following equation.

$$\log \frac{p(a, b)^2}{p(a)p(b)}$$

Here, the p(a, b) in the numerator is an estimated likelihood that a given keyword unit occurs with the set of source multi-language comments under p(a, b) and the p(a)p(b) in the denominator is an estimated likelihood that the given keyword unit occurs with the set of source multi-language comments under p(a)p(b).

Keyword units in a tier may then be ranked within the tier from in order of their pairwise mutual information measures from highest to lowest.

Once keyword units are grouped into tiers based on coverage and the keyword units within each tier ranked according to their respective pairwise mutual information measures, then keyword units may be selected for inclusion in the set of source keyword units. Up to a predetermined maximum number of keyword units may be selected for inclusion in the set of source keyword units. The predetermined maximum number may be selected according to the requirements of the particular implementation at hand. In an implementation, the predetermined maximum number is selected based on the number of keyword unit tags to present in a tag cloud. For example, the predetermined maximum number may be approximately thirty or so. Selection of keyword units for inclusion in the set of source keyword units starts with the top tier of keyword units starting with the keyword unit with the highest pairwise mutual information measure in the top tier and proceeding to select keyword units from the top tier in order of pairwise mutual information measures from highest to lowest until all keyword units of the top tier have been selected or until the predetermined maximum number of keyword units has been selected. If there are less than the predetermined maximum number of keyword units in the top tier, then selection of keyword units continues likewise with the next tier of keyword units, and so on, until the predetermined maximum number of keyword units has been selected.

As a result of operation 404, a set of source keyword units in the intermediate language are selected that provide coverage of the salient keyword unit concepts expressed in the source multi-language survey comments.

At operation 406, the set of source keyword units in the intermediate language is mapped to a set of target keyword units in the target language. For this, the intermediate language-to-target language dictionary constructed according to process 300 may be used. In particular, a keyword unit of the set of source keyword units is used as key into the dictionary to obtain the keyword unit in the target language that the source keyword unit is mapped to be the dictionary. The target keyword unit is then included in the set of target keyword units. Since the dictionary is constructed in a context-sensitive manner, as described above, the mapping of the set of source keyword units to the set of target keyword units is also context-sensitive.

At operation 406, the set of target keyword units is presented in a computer graphical user interface in the target language. For example, the set of target keyword units may be presented in a tag cloud where each keyword unit tag of the tag cloud corresponds to a target keyword unit of the set of target keyword units and presents the target keyword unit in the target language. Although an implementation presents the set of target keyword unit in a tag cloud, another implementation may present the set of target keyword units in a graphical user interface in another visual presentation manner (e.g., as a list).

Multi-Lingual Keyword Expansion

In an implementation, the global keyword unit dictionary is expanded to include intermediate language keyword units for a target language. As mentioned, individual keyword units of comments in a target language may contain cultural nuances that are lost-in-translation when translated individually by a natural language machine translator to the intermediate language. For example, the Chinese keyword unit "报酬," which roughly means "compensation" in English, might be translated out-of-context by the natural language machine translator to the English keyword-unit "renumeration."

To expand the global keyword unit dictionary, the set of comments in a target language (e.g., Chinese) may be translated on a comment-by-comment basis using a natural language machine translator to a corresponding set of intermediate language comments (e.g., in English). This may be repeated for each target language such that a corresponding set of intermediate language comments is generated for each target language. Intermediate language keyword units may then be extracted from the corresponding set of intermediate language comments by parsing and analyzing the corresponding set of intermediate language comments. This also may be repeated such that a set of distinct intermediate language keyword units is extracted from the corresponding set of intermediate language comments for each target language.

The corresponding set of intermediate language comments for a target language may be considered as a "document." And each keyword unit extracted from the corresponding set of intermediate language comments for the target language may be considered as a "term." Metrics may then be computed for terms to identify intermediate language keyword units to add global keyword unit dictionary.

In an implementation, a term is added to the global keyword unit dictionary if there is high pointwise mutual information between the document for a target language and the term and the term has low entropy across all documents for all target languages. In other words, a term of a document for a target language is added to the global keyword unit dictionary if the corresponding target language keyword unit is particularly salient for the target language.

In-Context Translation of the Global Keyword Unit Dictionary to a Target Language For each keyword unit in the intermediate language, individual translation by a natural language machine translator of the intermediate language keyword unit to a target language is sub-optimal because the translation by the natural language machine translator is out-of-context. Further, there may be multiple target language translations according to a natural language machine translator for a given intermediate language keyword unit, and vice versa. Thus, a context sensitive way of detecting mappings between keyword units in the target language to intermediate language keyword units is needed.

For example, individual out-of-context translation by a natural language machine translator of the Chinese keyword unit "配置," might translate to the English keyword unit "configuration." However, in the employee engagement context, the better translation for the Chinese keyword unit might be "staffing." Even if a target language comment is translated by a natural language machine translator as a whole, a keyword unit in the translated comment may still be out-of-context. For example, a Chinese language comment in the employee engagement context containing the Chinese keyword unit "福利," which in the employee engagement should be translated to "benefit" in English, might be translated by a natural language machine translator to "welfare," even if the target language comment is translated by the natural language machine translator as a whole in its entirety.

In an implementation, a target language-to-intermediate language dictionary is generated that contains context-sensitive mapping from target language keyword units to corresponding intermediate language keyword units. The target language-to-intermediate language dictionary may be generated according to a computer-implemented method. The method includes translating using a natural language machine translator a set of target language comments into a corresponding set of intermediate language comments (the set of translated comments) on a comment-by-comment basis. The method also includes extracting a set of target language keyword units are from the set of target language comments.

Across all pairs of comments where each pair of comments includes a target language comment of the set of target language comments and the corresponding translated comment of the set of translated comments, the method includes accumulating co-occurrence counts between each distinct pair of target keyword units extracted from the target language comments and the corresponding intermediate language keyword units extracted from the translated comments. The method then suggests mappings based on an intermediate language versus non-intermediate language probability. In particular, the co-occurrence count of (translated keyword unit, target language keyword unit) pair may be computed as the number of target language comments where the target language comment contains the target language keyword unit and the corresponding translated comment contains the translated keyword unit divided by the number of target language comments containing the target language keyword unit. For example, the co-occurrence count of ("welfare," "福利") may be computed as the number of target language comments that contain "福利" where the corresponding translated language comment contains "welfare" divided by the number of target language comments that contain "福利." If the co-occurrence count of a (translated keyword unit, target language keyword unit) pair is above a threshold, it may be included in the target language-to-intermediate language dictionary as a mapping from the target language keyword unit to the translated keyword unit. In addition, or alternatively, it may be included in the intermediate language-to-target language mapping from the translated keyword unit to the target language keyword unit.

It possible for the same target language keyword unit to be included in multiple keyword unit pairs. For example, the target language keyword unit may have multiple different in context translations to different translated keyword units. In this case, multiple mappings involving the target language keyword unit may be added to the target language-to-intermediate language dictionary and/or the intermediate language-to-target language dictionary.

In an implementation, a mapping that is added to the target language-to-intermediate language dictionary and/or the intermediate language-to-target language dictionary is first confirmed by human user input as a safeguard against mistranslation.

Example Keyword Unit Cloud

Figure 5:
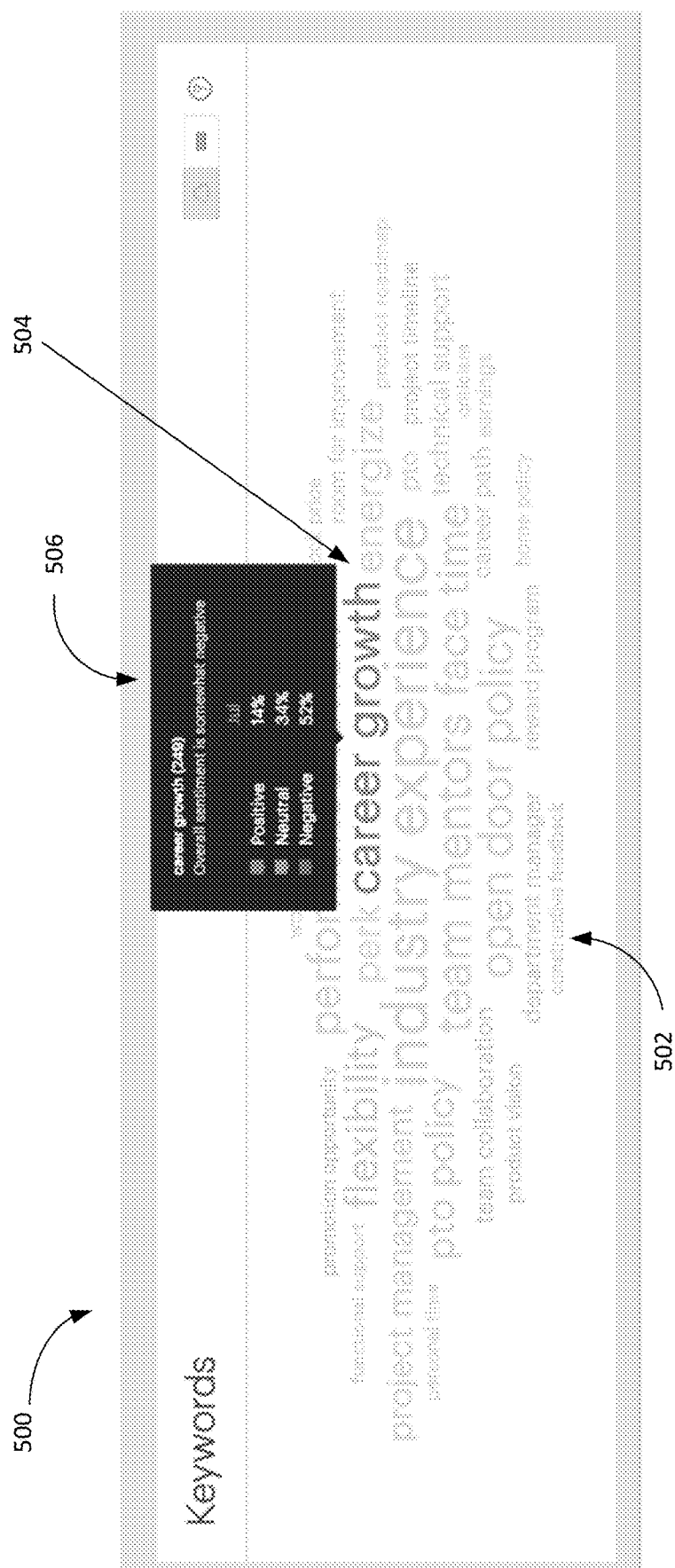
FIG. 5 is a screenshot depicting a tag cloud generating based on techniques disclosed herein for context-sensitive salient keyword unit surfacing for multi-language survey comments, according to an implementation of the present invention.

FIG. 5 is example graphical user interface (GUI) window 500, according to an implementation of the present invention. Example GUI window 500 includes keyword unit cloud 502. Keyword unit cloud 502 is generated according to techniques disclosed herein for context-sensitive salient keyword unit surfacing for multi-language survey comments. While Keyword unit cloud 502 includes keyword unit tags in the English language, the tags could just as easily be in another language using techniques disclosed herein.

In an implementation, keyword unit cloud 502 is interactive. For example, a user has provided user input (e.g., mouse click or touch gesture) that selects "career growth" keyword unit tag 504. In response to the user input selected tag 504, pop-up graphical user interface dialog 506 is displayed. Pop-up GUI dialog 506 indicates that a number (249) of survey comments during a time period (July) express the career growth concept in the form of one or more keyword units. Pop-up GUI dialog 506 also reflects the results of sentiment analysis on the career growth survey comments. In particular, percentages of those comments that have a positive, neutral, and negative sentiment about career growth are given. From this, a user can discern that a majority of employees may have a negative sentiment about career growth at the company.

Computing System Implementation

An implementation of the present invention may encompass performance of a method by a computing system having one or more processors and storage media. The one or more processors and the storage media may be provided by one or more computer systems. The storage media of the computing system may store one or more computer programs. The one or more programs may include instructions configured to perform the method. The instructions may also be executed by the one or more processors to perform the method.

An implementation of the present invention may encompass one or more non-transitory computer-readable media. The one or more non-transitory computer-readable media may store the one or more computer programs that include the instructions configured to perform the method.

An implementation of the present invention may encompass the computing system having the one or more processors and the storage media storing the one or more computer programs that include the instructions configured to perform the method.

For an implementation that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive. For example, one set of computer systems may store the one or more computer programs from which another, different set of computer systems downloads the one or more computer programs and executes the instructions thereof.

Figure 6:
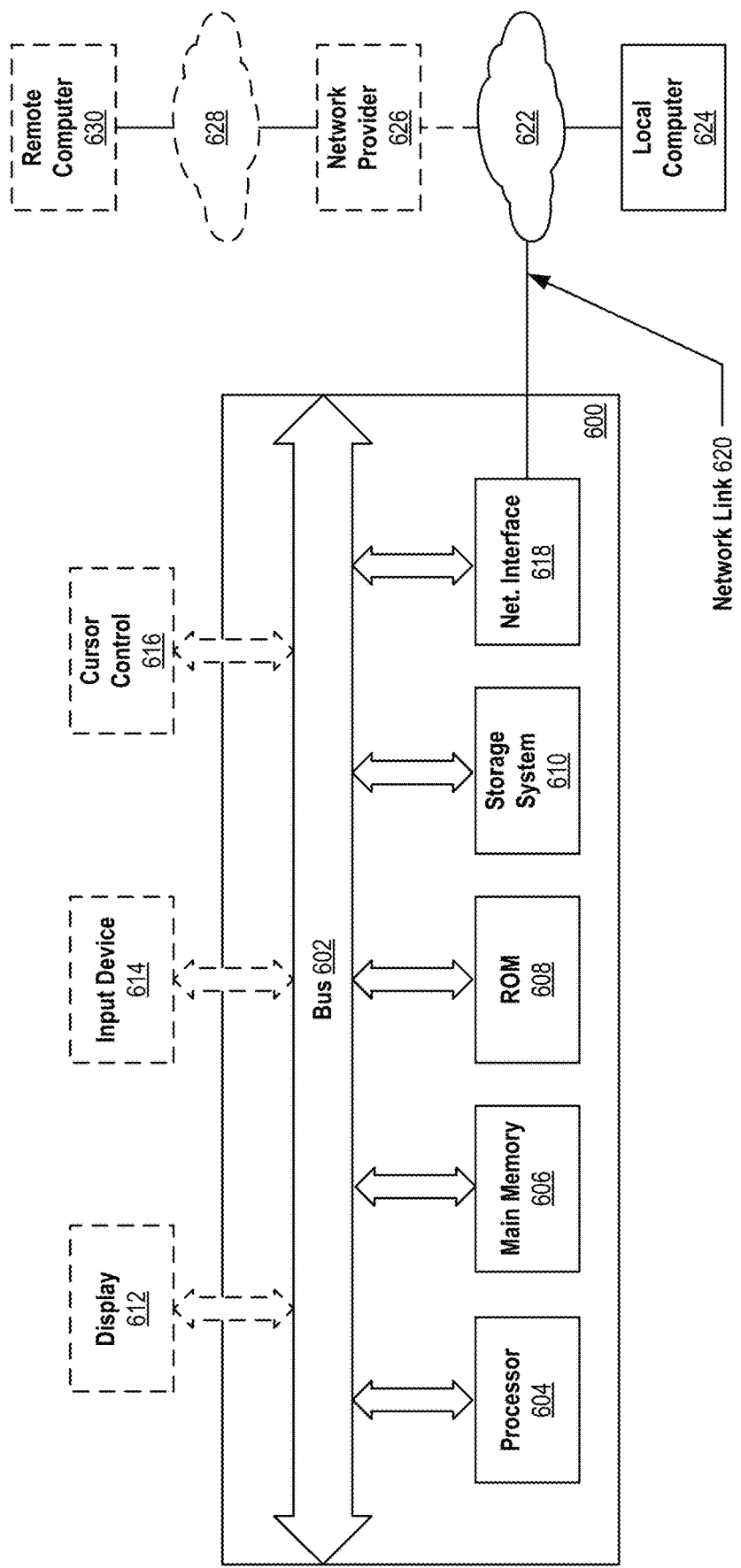
FIG. 6 is a block diagram that illustrates a computer system upon which an embodiment of the invention may be implemented.

FIG. 6 is a block diagram of example computer system 600 used in an implementation of the present invention. Computer system 600 includes bus 602 or other communication mechanism for communicating information, and one or more hardware processors coupled with bus 602 for processing information.

Hardware processor 604 may be, for example, a general-purpose microprocessor, a central processing unit (CPU) or a core thereof, a graphics processing unit (GPU), or a system on a chip (SoC).

Computer system 600 also includes a main memory 606, typically implemented by one or more volatile memory devices, coupled to bus 602 for storing information and instructions to be executed by processor 604. Main memory 606 also may be used for storing temporary variables or other intermediate information during execution of instructions by processor 604.

Computer system 600 may also include read-only memory (ROM) 608 or other static storage device coupled to bus 602 for storing static information and instructions for processor 604.

A storage system 610, typically implemented by one or more non-volatile memory devices, is provided and coupled to bus 602 for storing information and instructions.

Computer system 600 may be coupled via bus 602 to display 612, such as a liquid crystal display (LCD), a light emitting diode (LED) display, or a cathode ray tube (CRT), for displaying information to a computer user. Display 612 may be combined with a touch sensitive surface to form a touch screen display. The touch sensitive surface may be an input device for communicating information including direction information and command selections to processor 604 and for controlling cursor movement on display 612 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 614, including alphanumeric and other keys, may be coupled to bus 602 for communicating information and command selections to processor 604.

Another type of user input device may be cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Instructions, when stored in non-transitory storage media accessible to processor 604, such as, for example, main memory 606 or storage system 610, render computer system 600 into a special-purpose machine that is customized to perform the operations specified in the instructions. Alternatively, customized hard-wired logic, one or more ASICs or FPGAs, firmware and/or hardware logic which in combination with the computer system causes or programs computer system 600 to be a special-purpose machine.

A computer-implemented process may be performed by computer system 600 in response to processor 604 executing one or more sequences of one or more instructions contained in main memory 606. Such instructions may be read into main memory 606 from another storage medium, such as storage system 610. Execution of the sequences of instructions contained in main memory 606 causes processor 604 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 610) and/or volatile media (e.g., main memory 606). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 602. Transmission media can also take the form of acoustic or light waves, such as those generated during radio-wave and infra-red data communications.

Computer system 600 also includes a network interface 618 coupled to bus 602. Network interface 618 provides a two-way data communication coupling to a wired or wireless network link 620 that is connected to a local, cellular or mobile network 622. For example, communication interface 618 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. In an implementation, communication interface 618 sends and receives electrical, electromagnetic or optical signals that carry digital data streams representing various types of information.

Network link 620 typically provides data communication through one or more networks to other data devices. For example, network link 620 may provide a connection through network 622 to local computer system 624 that is also connected to network 622 or to data communication equipment operated by a network access provider 626 such as, for example, an internet service provider or a cellular network provider. Network access provider 626 in turn provides data communication connectivity to another data communications network 628 (e.g., the internet). Networks 622 and 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the networks 622 and 628, network link 620 and communication interface 618. In the internet example, a remote computer system 630 might transmit a requested code for an application program through network 628, network 622 and communication interface 618. The received code may be executed by processor 604 as it is received, and/or stored in storage device 610, or other non-volatile storage for later execution.

Conclusion

In the foregoing detailed description, implementations of the present invention have been described with reference to numerous specific details that may vary from implementation to implementation. The detailed description and the figures are, accordingly, to be regarded in an illustrative rather than a restrictive sense.

Reference in the detailed description to an implementation of the present invention is not intended to mean that the implementation is exclusive of other disclosed implementations of the present invention, unless the context clearly indicates otherwise. Thus, a described implementation may be combined with one or more other described implementations in a given implementation, unless the context clearly indicates that the implementations are incompatible. Further, the described implementations are intended to illustrate the present invention by example and are not intended to limit the present invention to the described implementations.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

As used in the foregoing detailed description and in the appended claims of the various described implementations, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

For situations in which implementations discussed above collect information about users, the users may be provided with an opportunity to opt in/out of programs or features that may collect personal information. In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized rather than associated with a particular user. For example, the user preferences or user interactions may be generalized based on user demographics.

The invention claimed is:

1. A method performed by a computing system, the computing system having one or more processors and storage media, the storage media storing one or more computer programs, the one or more computer programs including instructions configured to perform the method and executed by the one or more processors to perform the method, the one or more processors and the storage media provided by one or more computer systems of the computing system, the method comprising:

receiving a selection of a set of source multi-language survey comments;

constructing an intermediate language-to-target language keyword unit dictionary by:

obtaining a set of target language survey comments from the set of source multi-language survey comments;

machine translating the set of target language survey comments in the target language to a set of translated target language survey comments in the intermediate language, wherein said translating is context-sensitive;

identifying a plurality of translation pairs in the set of target language survey comments and the set of translated target language survey comments, wherein each translation pair comprises a first keyword unit and a second keyword unit, the first keyword unit corresponding to a respective keyword unit in the intermediate language extracted from the set of translated target language survey comments, the second keyword unit corresponding a respective keyword unit in the target language extracted from the set of target language survey comments; and for each translation pair in the plurality of translation pairs having an occurrence count above a threshold occurrence count, wherein the occurrence count reflects a number of times the translation pair occurs in the set of target language survey comments and the set of translated target language survey comments, adding the translation pair as a mapping to the intermediate language-to-target language keyword dictionary;

determining a set of source keyword units in an intermediate language that are relevant to the set of source multi-language survey comments;

mapping the set of source keyword units in the intermediate language to a set of target keyword units in a target language with mappings indicated in the intermediate language-to-target language keyword unit dictionary; and causing the set of target keyword units to be presented in the target language in a computer graphical user interface.

2. The method of claim 1, further comprising:

machine translating the set of target language survey comments in the target language to the set of translated target language survey comments in the intermediate language based on machine translating each target language survey comment of the set of target language survey comments to a corresponding translated target language survey comment of the set of translated target language survey comments.

3. The method of claim 1, wherein the selection corresponds to a plurality of attribute values; and wherein the method further comprises:

selecting the set of source multi-language survey comments, from a set of global multi-language survey comment, having the plurality of attribute values.

4. The method of claim 1, further comprising:

causing the set of target keyword units to be presented in the target language in a tag cloud in the computer graphical user interface.

5. The method of claim 1, further comprising:

determining the set of source keyword units in the intermediate language that are relevant to the set of source multi-language survey comments based on a coverage measure and a pairwise mutual information measure for the set of source keyword units with respect to the set of source multi-language survey comments.

6. One or more non-transitory computer-readable media comprising:

one or more computer programs including instructions configured for:

receiving a selection of a set of source multi-language survey comments;

constructing an intermediate language-to-target language keyword unit dictionary by:

obtaining a set of target language survey comments from the set of source multi-language survey comments;

machine translating the set of target language survey comments in the target language to a set of translated target language survey comments in the intermediate language, wherein said translating is context-sensitive;

identifying a plurality of translation pairs in the set of target language survey comments and the set of translated target language survey comments, wherein each translation pair comprises a first keyword unit and a second keyword unit, the first keyword unit corresponding to a respective keyword unit in the intermediate language extracted from the set of translated target language survey comments, the second keyword unit corresponding a respective keyword unit in the target language extracted from the set of target language survey comments; and for each translation pair in the plurality of translation pairs having an occurrence count above a threshold occurrence count, wherein the occurrence count reflects a number of times the translation pair occurs in the set of target language survey comments and the set of translated target language survey comments, adding the translation pair as a mapping to the intermediate language-to-target language keyword dictionary;

determining a set of source keyword units in an intermediate language that are relevant to the set of source multi-language survey comments;

mapping the set of source keyword units in the intermediate language to a set of target keyword units in a target language with mappings indicated in the intermediate language-to-target language keyword unit dictionary; and causing the set of target keyword units to be presented in the target language in a computer graphical user interface.

7. The one or more non-transitory computer-readable media of claim 6, wherein the instructions are further configured for:

machine translating the set of target language survey comments in the target language to the set of translated target language survey comments in the intermediate language based on machine translating each target language survey comment of the set of target language survey comments to a corresponding translated target language survey comment of the set of translated target language survey comments.

8. The one or more non-transitory computer-readable media of claim 6, wherein the selection corresponds to a plurality of attribute values; and wherein the instructions are further configured for:

selecting the set of source multi-language survey comments, from a set of global multi-language survey comment, having the plurality of attribute values.

9. The one or more non-transitory computer-readable media of claim 6, wherein the instructions are further configured for:

causing the set of target keyword units to be presented in the target language in a tag cloud in the computer graphical user interface.

10. The one or more non-transitory computer-readable media of claim 6, wherein the instructions are further configured for:

determining the set of source keyword units in the intermediate language that are relevant to the set of source multi-language survey comments based on a coverage measure and a pairwise mutual information measure for the set of source keyword units with respect to the set of source multi-language survey comments.

11. A computing system comprising:

one or more processors;

storage media;

one or more computer programs stored in the storage media and configured for execution by the one or more processors, the one or more computer programs including instructions configured for:

receiving a selection of a set of source multi-language survey comments;

constructing an intermediate language-to-target language keyword unit dictionary by:

obtaining a set of target language survey comments from the set of source multi-language survey comments;

machine translating the set of target language survey comments in the target language to a set of translated target language survey comments in the intermediate language, wherein said translating is context-sensitive;

identifying a plurality of translation pairs in the set of target language survey comments and the set of translated target language survey comments, wherein each translation pair comprises a first keyword unit and a second keyword unit, the first keyword unit corresponding to a respective keyword unit in the intermediate language extracted from the set of translated target language survey comments, the second keyword unit corresponding a respective keyword unit in the target language extracted from the set of target language survey comments; and for each translation pair in the plurality of translation pairs having an occurrence count above a threshold occurrence count, wherein the occurrence count reflects a number of times the translation pair occurs in the set of target language survey comments and the set of translated target language survey comments, adding the translation pair as a mapping to the intermediate language-to-target language keyword dictionary;

determining a set of source keyword units in an intermediate language that are relevant to the set of source multi-language survey comments;

mapping the set of source keyword units in the intermediate language to a set of target keyword units in a target language with mappings indicated in the intermediate language-to-target language keyword unit dictionary; and causing the set of target keyword units to be presented in the target language in a computer graphical user interface.

12. The computing system of claim 11, wherein the instructions are further configured for:

machine translating the set of target language survey comments in the target language to the set of translated target language survey comments in the intermediate language based on machine translating each target language survey comment of the set of target language survey comments to a corresponding translated target language survey comment of the set of translated target language survey comments.

13. The computing system of claim 11, wherein the selection corresponds to a plurality of attribute values; and wherein the instructions are further configured for:

selecting the set of source multi-language survey comments, from a set of global multi-language survey comment, having the plurality of attribute values.

14. The computing system of claim 11, wherein the instructions are further configured for:

causing the set of target keyword units to be presented in the target language in a tag cloud in the computer graphical user interface.

15. The computing system of claim 11, wherein the instructions are further configured for:

determining the set of source keyword units in the intermediate language that are relevant to the set of source multi-language survey comments based on a coverage measure and a pairwise mutual information measure for the set of source keyword units with respect to the set of source multi-language survey comments.

16. The method of claim 5, wherein determining the set of source keyword units in the intermediate language that are relevant to the set of source multi-language survey comments based on a coverage measure further comprises:

for each source keyword unit in the set of source keyword units in the intermediate language, computing the percentage of the set of source multi-language survey comments in which the keyword unit appears.

17. The one or more non-transitory computer-readable media of claim 10, wherein the instructions configured for determining the set of source keyword units in the intermediate language that are relevant to the set of source multi-language survey comments based on a coverage measure, are further configured for:

computing the percentage of the set of source multi-language survey comments in which a keyword unit appears for each source keyword unit in the set of source keyword units in the intermediate language.

18. The computing system of claim 15, wherein the instructions configured for determining the set of source keyword units in the intermediate language that are relevant to the set of source multi-language survey comments based on a coverage measure, are further configured for:

computing the percentage of the set of source multi-language survey comments in which a keyword unit appears for each source keyword unit in the set of source keyword units in the intermediate language.

* * * * *